United States Patent Office 3,275,653
Patented Sept. 27, 1966

1

3,275,653
2-AZABICYCLO[3,2,0]HEPT-6-EN-3-ONES AND PROCESS FOR THEIR PRODUCTION
Leo A. Paquette, Portage Township, Kalamazoo County, Mich., assignor to The Upjohn Company, Kalamazoo, Mich., a corporation of Delaware
No Drawing. Original application May 9, 1963, Ser. No. 279,294. Divided and this application Dec. 3, 1965, Ser. No. 525,788
7 Claims. (Cl. 260—326.5)

This is a division of application Serial No. 279,294, filed May 9, 1963.

This invention relates to novel compositions of matter and to methods for their preparation. In particular, this invention relates to novel 2-azabicyclo[3,2,0]hept-6-en-3-ones of the formula:

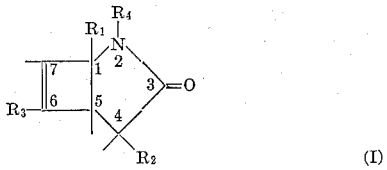

and to novel 2-azabicyclo[3,2,0]heptan-3-ones of the formula:

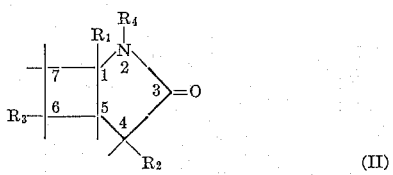

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, and wherein $R_4$ is selected from the group consisting of hydrogen, alkyl of 1 to 6 carbon atoms, inclusive, alkenyl of 3 to 6 carbon atoms, inclusive, alkynyl of 3 to 6 carbon atoms, inclusive, cycloalkyl of 5 to 10 carbon atoms, inclusive, and aralkyl of 7 to 11 carbon atoms, inclusive. $R_1$ and $R_2$ can be the same or different. When $R_3$ is alkyl, it can be the same as or different than $R_1$ or $R_2$. When $R_4$ is alkyl, it can be the same as or different than $R_1$, $R_2$, or $R_3$.

Examples of alkyl of 1 to 4 carbon atoms, inclusive, are methyl, ethyl, propyl, butyl, and isomeric forms thereof. Examples of alkyl of 1 to 6 carbon atoms, inclusive, are methyl, ethyl, propyl, butyl, pentyl, hexyl, and isomeric forms thereof. Examples of alkenyl of 3 to 6 carbon atoms, inclusive, are allyl, 1-methylallyl, 2-methylallyl (methallyl), 2-butenyl (crotyl), 3-butenyl, 1,2-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,3-dimethyl-2-butenyl, 1-ethyl-2-butenyl, 4-methyl-2-pentenyl, 5-hexenyl, and the like. Examples of alkynyl of 3 to 6 carbon atoms, inclusive, are 2-propynyl (propargyl), 1-methyl-2-propynyl, 2-butynyl, 3-butynyl, 1-methyl-2-butynyl, 1-methyl-3-butynyl, 3-pentynyl, 1,2-dimethyl-3-butynyl, 4-pentynyl, 2-methyl-3-pentynyl, 3-hexynyl, and the like. Examples of cycloalkyl of 5 to 10 carbon atoms, inclusive, are cyclopentyl, cyclohexyl, 2-methylcyclopentyl, 2 - methylcyclohexyl, 3-methycyclohexyl, 4 - methylcyclohexyl, 2 - ethylcyclopentyl, 3-ethylcyclopentyl, 3 - ethylcyclohexyl, 2 - propylcyclopentyl, 3-isopropylcyclopentyl, 4 - propylcyclohexyl, 2,3 - dimethylcyclohexyl, 2 - methyl - 4 - ethylcyclohexyl, cycloheptyl, 3-ethylcycloheptyl, cyclooctyl, 4-tert-butylcyclohexyl, 2,3-dimethylcyclooctyl, cyclononyl, cyclodecyl, and the like. Examples of aralkyl of 7 to 11 carbon atoms, inclusive, are benzyl, phenethyl, 2-phenylpropyl, 3-phenylpropyl, 4-phenylbutyl, 1-naphthylmethyl, 2-naphthylmethyl, and the like.

The novel 2-azabicyclo[3,2,0]hept-6-en-3-ones and 2-azabicyclo[3,2,0]heptan-3-ones of Formulas I and II, respectively, are useful for the treatment of topical fungal infections in mammals and other animals caused by fungi such as a *Trichophyton rubrum*, or for eradicating such fungi from inanimate objects. Also they are useful in the treatment of plant infections caused by such fungi as *Alternaria solani* and *Sclerotinia fructicola*.

These compounds have also demonstrated anti-inflammatory activity as shown by the granuloma pouch technique in rats and are useful in treating inflammatory conditions topically, locally, and systemically in mammals, e.g., cattle, horses, dogs, and cats, and in birds, e.g., poultry. Tests with animals have also shown these compounds to have sedative, analgetic, diuretic, and anorexigenic effects, and the compounds are therefore useful for these purposes.

The novel compounds of Formulas I and II are also of value as intermediates in chemical synthesis. For example, by replacement of the carbonyl oxygen atom by two hydrogen atoms, e.g., by reduction with lithium aluminum hydride, the corresponding 2-azabicyclo[3,2,0] hepto-6-enes and 2-azabicyclo[3,2,0]heptanes are formed. These bicyclic amines form salts with thiocyanic acid which, by condensation with formaldehyde, form resinous materials useful as pickling inhibitors according to U.S. Patents 2,425,320 and 2,606,155. These bicyclic amines form salts with thiocyanic acid which, by condensation with formaldehyde, form resinous materials useful as pickling inhibitors according to U.S. Patents 2,425,320 and 2,606,155. These bicyclic amines also form salts with fluosilicic acid which are useful as mothproofing agents according to U.S. Patents 1,915,334 and 2,075,359.

The novel compounds of Formulas I and II also are of value as monomers for the synthesis of useful polymeric materials. For example, they are lactams, and, particularly when $R_4$ is hydrogen, can be transformed into useful polyamide films and fibers. Moreover, they can also be copolymerized with a major or a minor amount of another lactam, for example, caprolactam or 2-pyrrolidone, to form useful polyamide films and fibers. Methods for polymerizing lactams are generally known in the art (e.g., Houben-Weyl, "Methoden der Organischen Chemie," 4th ed., vol. 14, pt. I, 111–131 (1963); U.S. Patents 2,638,-463; 2,739,959; 2,809,958; 2,891,038; 2,912,415; and 2,-973,343). Methods for preparing polyamide copolymers are also known in the art (e.g., U.S. Patent 2,958,677). Polyamide polymers and copolymers prepared from 2-azabicyclo[3,2,0]hept-6-en-3-ones of Formula I, preferably wherein $R_4$ is hydrogen, are especially useful because they have numerous molecular sites for cross-linking, for example, by carbon bridges or disulfide bridges, or both.

2-azabicyclo[3,2,0]hept-6-en-3-ones of Formula I are prepared by exposing Formula III 1,3-dihydro-2H-azepin-2-ones to ultraviolet radiation according to the equation:

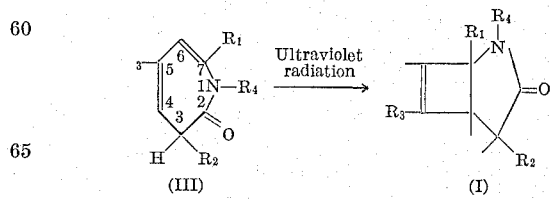

In this equation, $R_1$, $R_2$, $R_3$, and $R_4$ are as given above.

1,3-dihydro-2H-azepin-2-ones of Formula III wherein $R_4$ is hydrogen are either known in the art or can be prepared by the method known in the art, i.e., by interaction of the sodium salt of a di-ortho-substituted phenol with an ethereal solution of chloramide ($ClNH_2$), preferably in the presence of an excess of the phenol [Theilacker et al., Angew. Chem. 72, 131 (1960); ibid., 75, 208–9 (1963)]. Phenols suitable for this reaction are known in the art or can be prepared by methods known in the art [e.g., U.S. Patents 2,831,898; 2,841,622; 2,841,623; and 2,841,624; British Patents 717,588 and 776,204; Kolka et al., J. Org. Chem. 22, 642–6 (1957); Stroh et al., Angew. Chem. 69, 699–706 (1957)]. Examples of suitable phenols are:

2,6-dimethylphenol (2,6-xylenol),
2,4,6-trimethylphenol (mesitol),
2,6-diethylphenol,
2,4,6-triethylphenol,
2,6-dipropylphenol,
2,6-diisopropylphenol,
2,4,6-triisopropylphenol,
2,6-diisobutylphenol,
2,4,6-tri-tert-butylphenol,
2-ethyl-6-methylphenol,
2-methyl-6-propylphenol,
2-ethyl-6-propylphenol,
2-tert-butyl-6-methylphenol,
2-sec-butyl-6-methylphenol,
2-tert-butyl-6-ethylphenol,
2-tert-butyl-6-isopropylphenol,
2-isobutyl-6-propylphenol,
4-sec-butyl-2,6-dimethylphenol,
4-tert-butyl-2,6-dimethylphenol,
2,4-dimethyl-6-ethylphenol,
2,4-dimethyl-6-propylphenol,
6-tert-butyl-2,4-dimethylphenol,
2,6-diethyl-4-methylphenol,
2,6-diisopropyl-4-methylphenol,
2,4-di-tert-butyl-6-methylphenol,
2,6-di-tert-butyl-4-ethylphenol,
2,4-di-tert-butyl-6-propylphenol,
2,6-diisobutyl-4-propylphenol,
2,6-di-tert-butyl-4-sec-butylphenol,
2-tert-butyl-4-ethyl-6-methylphenol,
2-sec-butyl-6-isopropyl-4-methylphenol,
2-butyl-6-tert-butyl-4-methylphenol, and the like.

1,3-dihydro-2H-azepin-2-ones of Formula III wherein $R_4$ is as given above but not hydrogen are prepared from the corresponding Formula III 1,3-dihydro-2H-azepin-2-ones wherein $R_4$ is hydrogen by replacing said hydrogen with the appropriate alkyl, alkenyl, alkynyl, cycloalkyl, or aralkyl moiety. This N-substitution is carried out in two steps according to the equation:

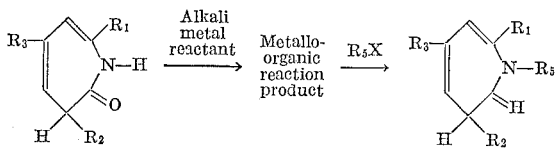

In this equation, $R_1$, $R_2$ and $R_3$ are as given above; the alkali metal reactant is a material selected from the group consisting of alkali metals, alkali metal hydrides, and alkali metal amides; and $R_5X$ is an organic halide wherein X is selected from the group consisting of chloride, bromide, and iodide, and wherein $R_5$ is selected from the group consisting of alkyl of 1 to 6 carbon atoms, inclusive, alkenyl of 3 to 6 carbon atoms, inclusive, alkynyl of 3 to 6 carbon atoms, inclusive, cycloalkyl of 5 to 10 carbon atoms, inclusive, and aralkyl of 7 to 11 carbon atoms, inclusive. It will be noted that this definition of $R_5$ excludes hydrogen but is otherwise the same as the above definition of $R_4$.

2-azabicyclo[3,2,0]hept-6-en-3-ones of Formula I wherein $R_4$ is as given above but not hydrogen can alternatively be prepared from the corresponding Formula I 2-azabicyclo[3,2,0]hept-6-en-3-ones wherein $R_4$ is hydrogen by replacing said hydrogen with the appropriate alkyl, alkenyl, alkynyl, cycloalkyl, or aralkyl moiety. This N-substitution is similar to the above-outlined N-substitution of a 1,3-dihydro-2H-azepin-2-one, and involves first, reaction of the latter 2-azabicyclo[3,2,0]hept-6-en-3-one with a material selected from the group consisting of alkali metals, alkali metal hydrides, and alkali metal amides, and second, reaction of the resulting metallo-organic reaction product with an organic halide of the formula $R_5X$ as defined above. Thereby, the N-H moiety of the 2-azabicyclo[3,2,0]hept-6-en-3-one reactant is transformed to an N—$R_5$ moiety. The 2-azabicyclo[3,2,0]hept-6-en-3-one reactant is prepared as outlined above by ultraviolet irradiation of a 1,3-dihydro-2H-azepin-2-one (Formula III; $R_4$ is hydrogen).

Both of the above-outlined two-step N-substitutions are carried out under substantially the same reaction conditions. Examples of suitable alkali metal reactants for these reactions are lithium metal, sodium metal, potassium metal, lithium hydride, sodium hydride, potassium hydride, lithium amide, sodium amide, and potassium amide. Sodium metal, sodium hydride, and sodium amide are preferred because they are relatively inexpensive and of particularly suitable reactivity for this purpose. The alkali metal, alkali metal hydride, or alkali metal amide is preferably used in a finely divided form, preferably in admixture with or as a suspension or dispersion in an inert liquid, for example, benzene, toluene, xylene, cumene, mesitylene, tetrahydronaphthalene, hexane, heptane, octane, mineral oil, dioxane, dimethylformamide, N-methylpyrrolidone, dimethyl sulfoxide, dialkyl ethers of ethylene glycol, dialkyl ethers of diethylene glycol, and mixtures thereof. Particularly preferred is an approximately 50 percent dispersion of micron-range sodium hydride crystals in mineral oil. An inert liquid of the type mentioned above can also with advantage be used as a solvent or diluent for the 1,3-dihydro-2H-azepin-2-one or 2-azabicyclo[3,2,0]hept-6-en-3-one reactant.

The alkali metal reactant and the 1,3-dihydro-2H-azepin-2-one or 2-azabicyclo[3,2,0]hept-6-en-3-one reactant are mixed, and the reaction between them is carried out at temperatures which can vary from about 0° to about 150° C., preferably from about 25° to about 100° C. The most suitable temperature will of course depend upon such factors as the reactivities of the alkali metal reactant and the 1,3-dihydro-2H-azepin-2-one or 2-azabicyclo-[3.2.0]hept-6-en-3-one, and the nature of the solvent. For example, relatively high reaction temperatures are usually necessary when using lithium reactants, and lower temperatures are preferred when using the more reactive materials such as potassium reactants. With the sodium reactants, for example, sodium hydride, reaction temperatures ranging from about 25° to about 100° C. are preferred but higher or lower temperatures can be used. It is preferred to react approximately equimolecular amounts of the 1,3-dihydro-2H-azepin-2-one or 2 azabicyclo [3,2,0]-hept-6-en-3-one reactant and the alkali metal reactant, although an excess of either reactant can be used. The time required for completing the reaction will depend on the reaction temperature, the reactivities of the two reactants, and the nature of the solvent. Illustratively, with sodium hydride, the reaction usually requires about 15 minutes to about 3 hours at temperatures ranging from about 50° to about 100° C.

After the reaction between the alkali metal reactant and the 1,3-dihydro-2H-azepin-2-one or 2-azabicyclo-[3,2,0]hept-6-en-3-one reactant is complete, the metallo-organic reaction product can be isolated from the reaction mixture, for example, by removal of the solvent by evaporation or distillation, and can be purified if desired, for example, by washing or digestion with a suitable solvent, for example, additional portions of the reaction solvent. However, where the character of the reaction mixture indicates the absence of a substantial amount of impurities, it is preferred to use the entire reaction mixture containing the metallo-organic reaction product in the next step of the reaction sequence which is a reaction with the organic halide of the formula $R_5X$, as above defined.

The organic bromides and iodides are preferred for this next step because of their greater reactivity, although the organic chlorides can be used and are advantageous in some instances because they are usually less expensive. Suitable organic bromides are methyl bromide, ethyl bromide, propyl broamide, isopropyl bromide, butyl bromide, sec-butyl bromide, isobutyl bromide, pentyl bromide, isopentyl bromide, 2-methylbutyl bromide, 1,2-dimethylpropyl bromide, 1-ethylpropyl bromide, 1-methylbutyl bromide, hexyl bromide, isohexyl bromide, 1-methylpentyl bromide, 1-ethylbutyl bromide, 2-methylphenyl bromide, 1,2-dimethylbutyl bromide, allyl bromide, 2-methylallyl bromide, 2-butenyl bromide, 3-butenyl bromide, 1,2-dimethylallyl bromide, 2-ethylallyl bromide, 1-methyl-2-butenyl bromide, 2-methyl-2-butenyl bromide, 3-methyl-2-butenyl bromide, 2,3-dimethyl-2-butenyl bromide, 1,3-dimethyl-2-butenyl bromide, 1-ethyl-2-butenyl bromide, 4-methyl-2-pentenyl bromide, 2-propynyl bromide, 2-butynyl bromide, 1-methyl-2-propynyl bromide, 3-butynyl bromide, 1-methyl-3-butynyl bromide, 3-pentynyl bromide, 4-pentynyl bromide, 3-hexynyl bromide, 2-methyl-3-pentynyl bromide, cyclopentyl bromide, cyclohexyl bromide, 2-methylcyclopentyl bromide, 2-methylcyclohexyl bromide, 3-methylcyclohexyl bromide, 4-methylcyclohexyl bromide, 2-ethylcyclopentyl bromide, 3-ethylcyclopentyl bromide, 4-ethylcyclohexyl bromide, 3-isopropylcyclopentyl bromide, 2,3-dimethylcyclohexyl bromide, cycloheptyl bromide, cyclooctyl bromide, 4-tert-butylcyclohexyl bromide, cyclonoyl bromide, cyclodecyl bromide, benzyl bromide, phenethyl bromide, 2-phenylpropyl bromide, 3-phenylpropyl bromide, 4-phenylbutyl bromide, 1-naphthylmethyl bromide, 2-naphthylmethyl bromide, and the like. Suitable chlorides and iodides are those corresponding to the above bromides. These halides are either known in the art or can be prepared by methods known in the art, for example, by reaction of the corresponding alcohol with a phosphorus halide, by halogenation of a suitable saturated hydrocarbon, or by addition of a hydrogen halide to a suitable unsaturated hydrocarbon.

The organic halide is added to the metallo-organic reaction mixture either dropwise or in larger portions. Alternatively, the metallo-organic reaction mixture can be added in a similar manner to the organic halide. In either case, the organic halide can be dissolved in a suitable inert solvent, preferably in one or more of the solvents already present in the metallo-organic reaction mixture. Although only one molecular equivalent of the organic halide is required for reaction with one molecular equivalent of the metallo-organic reaction product, preferably calculated on the basis of the amount of 1,3-dihydro-2H-azepin-2-one or 2-azabicyclo[3,2,0]hept-6-en-3-one used to prepare the latter, it is preferred to use an excess of the organic halide, for example, about 1.01 to about 5 or even more molecular equivalents of the halide per molecular equivalent of the metallo-organic reaction product. Particularly preferred is the use of about 1.05 to about 2 molecular equivalents of organic halide per molecular equivalent of metallo-organic reaction product. Suitable reaction times and reaction temperatures for the interaction of organic haldie and metallo-organic reaction product depend upon the nature of the reactants and the solvent, and the usual inverse relationship between time and temperature is observed. The organic iodides are the most reactive and the organic chlorides the least reactive. Suitable reaction temperatures range from about 0° to about 200° C., preferably from about 10° to about 75° C. Usually, reaction temperatures ranging from about 25° to about 75° C. and reaction times ranging from about 1 to about 8 hours are satisfactory. The desired N-substituted 1,3-dihydro-2H-axepin-2-one or N-substituted 2-azabicyclo[3,2,0]hept-6-en-3-one can be isolated from the reaction mixture by conventional methods, for example, by removal of reaction solvent by evaporation or distillation. If an alkali metal halide is present as a solid in the reaction mixture, it may with advantage be removed by filtration before the desired organic reaction product is isolated.

With regard to the transformation of a 1,3-dihydro-2H-azepin-2-one of Formula III to a 2-azabicyclo[3,2,0]hept-6-en-3-one of Formula I, any source of ultraviolet radiation can be used. Compounds within the scope of Formula III generally absorb ultraviolet radiation strongly in the wave-length range 240 to 260 millimicrons, and it is preferred that the ultra-violet radiation include this range of wave lengths. It is not essential that other wave lengths of radiation be excluded, and therefore, either filtered or unfiltered ultraviolet radiation can be used.

The intensity of ultraviolet radiation is not critical. For example, merucry arcs with quartz envelopes and rated at 100 to 1000 watts, preferably 200 watts, are useful in this process.

It is preferred to carry out the irradiation in the range about 20° to about 40° C., although higher or lower temperatures, for example, about 0° to about 80° C. can be used. It is also preferred to use an inert reaction solvent, with the Formula III reactant present in the concentration range about 0.1% to about 15% by weight, preferably about 0.5% to about 3% by weight. Solvents useful for this purpose include methanol, ethanol, propanol, isopropyl alcohol, benzene, toluene, hexane, chloroform, carbon tetrachloride, diethyl ether, tetrahydrofuran, and the like. Particularly preferred as solvents are methanol and tetrahydrofuran.

The length of time required for the irradiation is dependent on such factors as the nature of the reactant, the nature of the reaction solvent, the intensity of the radiation, and the temperature. For example, with a 200-watt mercury arc, the reaction requires about 10 to about 100 hours at about 25° C. The course of the reaction can be followed easily by observing the gradual disappearance of the characteristic ultraviolet absorption spectrum of the Formula III 1,3-dihydro-2H-azepin-2-one reactant, particularly the absorption in the region 240 to 260 millimicrons.

The 2-azabicyclo[3,2,0]hept-6-en-3-one product can be isolated from the reaction mixture and purified by conventional techniques, for example, by evaporation of the solvent, followed by crystallizaiton from a suitable solvent or mixture of solvents, by partition between two immiscible solvents, by chromatography, or by a combination of these techniques.

2-azabicyclo[3,2,0]heptan-3-ones of Formula II, wherein $R_1$, $R_2$, and $R_3$ are as given above, and wherein $R_4$ is limited to hydrogen, alkyl of 1 to 6 carbon atoms, cycloalkyl of 5 to 10 carbon atoms, and aralkyl of 7 to 11 carbon atoms, are prepared by reduction of Formula I 2-azabicyclo[3,2,0]hept-6-en-3-ones. Catalytic hydrogenation is preferred for this reduction. Suitable catalysts are those effective to saturate a carbon-carbon double or triple bond; examples are noble metals such as platinum, palladium, rhodium, and the like, and base metals such as Raney nickel, Raney cobalt, and the like. A palladium catalyst on a carrier such as carbon is generally preferred. In some instances, however, particularly when $R_4$ is aralkyl, e.g., benzyl, a tendency toward hydrogenolysis of the $R_4$ moiety is observed. In such instances, hydrogenolysis is likely to be lessened by use of a rhodium catalyst rather than one of the other hydrogenation catalysts mentioned above.

The hydrogenation is preferably carried out in the presence of an inert solvent. Suitable solvents include methanol, ethanol, isopropyl alcohol, acetic acid, ethyl acetate, diethyl ether, dioxane, and the like. Hydrogenation pressures ranging from about atmospheric to about 50 p.s.i. and hydrogenation temperatures ranging from about 10° to about 100° C. are preferred.

The 2-azabicyclo[3,2,0]heptan-3-one product can be isolated from the hydrogenation reaction mixture by conventional techniques, for example, by filtration of the catalyst and removal of solvent by distillation. The product can be purified by conventional techniques, for example, by crystallization from a suitable solvent or mixture of solvents, by partition between two immiscible solvents, by chromatography, or by a combination of these techniques.

This hydrogenation process is not suitable for the production of a Formula II 2-azabicyclo[3,2,0]heptan-3-one wherein $R_4$ is alkenyl or alkynyl as above defined. Usually, the desired hydrogenation of the endocyclic 6,7-double bond is accompanied by simultaneous hydrogenation of the alkenyl or alkynyl moiety to an alkyl moiety. It is preferred to prepare Formula II 2-azabicyclo[3,2,0]heptan-3-ones wherein $R_4$ is alkenyl or alkynyl by reacting a Formula II 2-azabicyclo[3,2,0]heptan-3-one, wherein $R_4$ is hydrogen, first with a material selected from the group consisting of alkali metals, alkali metal hydrides, and alkali metal amides, and then with the appropriate alkenyl or alkynyl chloride, bromide, or iodide. This procedure can also be used with alkyl, cycloalkyl, or aralkyl halides as above defined, providing thereby an alternative route to the 2-azabicyclo[3,2,0]heptan-3-ones of Formula II wherein $R_4$ is alkyl, cycloalkyl, or aralkyl. This two-step N-substitution of a 2-azabicyclo[3,2,0]heptan-3-one of Formula II wherein $R_4$ is hydrogen is carried out according to the procedures described in detail above for the N-substitution of 1,3-dihydro-2H-azepin-2-ones and 2-azabicyclo[3,2,0]hept-6-en-3-ones.

The invention can be more fully understood by the following examples.

EXAMPLE 1

Part A.—1,3-dihydro-3,5,7-trimethyl-2H-azepin-2-one

Following the procedure of Theilacker et al., supra, the sodium salt of 2,4,6-trimethylphenol was reacted with chloramide in the presence of an excess of this phenol. 1,3-dihydro-3,5,7-trimethyl-2H-azepin-2-one was obtained; M.P. 132° C.

Part B.—1,4,6-trimethyl-2-azabicyclo[3,2,0]hept-6-en-3-one

A solution of 1,3-dihydro-3,5,7-trimethyl-2H-azepin-2-one (5.0 g.; 0.033 mole) in 350 ml. of methanol was exposed to unfiltered ultraviolet radiation from a water-cooled, immersion-type, 200 watt, quartz Hanovia lamp for 22 hours. The temperature of the solution remained at about 20° to 25° C. during this time. The solvent was then removed by distillation and the residual brown oil was adsorbed on a 300-g. column of Florisil (60–100 mesh; a magnesium trisilicate; obtained from the Floridin Company, Tallahassee, Fla.). Elution with 4000 ml. of hexane was followed by elution with 2000 ml. of a mixture of acetone and hexane (1:10 by volume). Evaporation of the first eluate gave 1.15 g. of starting material. Evaporation of the second eluate gave 2.1 g. of a white solid which was recrystallized from hexane to give 1,4,6-trimethyl-2-azabicyclo[3,2,0]hept-6-en-3-one; M.P. 72–73° C.

Analysis.—Calcd. for $C_9H_{13}NO$: C, 71.49; H, 8.67; N, 9.26. Found: C, 71.25; H, 8.36; N, 9.20.

Following the procedure of Example 1, Part A, but substituting for the 2,4,6-trimethylphenol,
2,6-dimethylphenol;
2,6-diethylphenol;
2,6-dipropylphenol;
2,6-diisopropylphenol;
2,6-diisobutylphenol;
2,6-dibutylphenol;
2,4,6-triethylphenol;
2,6-diethyl-4-methylphenol;
2,6-dimethyl-4-ethylphenol;
4-tert-butyl-2,6-dimethylphenol;
2,6-diisopropyl-4-methylphenol;
2,6-diisobutyl-4-propylphenol;
4-sec-butyl-3,6-dimethylphenol; and 2,4,6-triisopropylphenol, there are obtained 1,3-dihydro-3,7-dimethyl-2H-azepin-2-one;
1,3-dihydro-3,7-diethyl-2H-azepin-2-one;
1,3-dihydro-3,7-dipropyl-2H-azepin-2-one;
1,3-dihydro-3,7-diisopropyl-2H-azepin 2-one;
1,3-dihydro-3,7-diisobutyl-2H-azepin-2-one;
1,3-dihydro-3,7-dibutyl-2H-azepin-2-one;
1,3-dihydro-3,5,7-triethyl-2H-azepin-2-one;
1,3-dihydro-3,7-diethyl-5-methyl-2H-azepin-2-one;
1,3-dihydro-3,7-dimethyl-5-ethyl-2H-azepin-2-one;
1,3-dihydro-5-tert-butyl-3,7-dimethyl-2H-azepin-2-one;
1,3-dihydro-3,7-diisopropyl-5-methyl-2H-azepin-2-one;
1,3-dihydro-3,7-diisobutyl-5-propyl-2H-azepin-2-one;
1,3-dihydro-5-sec-butyl-3,7-dimethyl-2H-azepin-2-one; and
1,3-dihydro-3,5,7-triisopropyl-2H-azepin - 2 - one, respectively.

Following the procedure of Example 1, Part B, but substituting for the 1,3-dihydro-3,5,7-trimethyl-2H-azepin-2-one, each of the above 1,3-dihydro-2H-azepin-2-ones, in the order listed, there are obtained 1,4-dimethyl-2-azabicyclo[3,2,0]hept-6-en-3-one;
1,4-diethyl-2-azabicyclo[3,2,0]hept-6-en-3-one; ;
1,4-dipropyl-2-azabicyclo[3,2,0]hept-6-en-3-one;
1,4-diisopropyl-2-azabicyclo[3,2,0]hept-6-en-3-one;
1,4-diisobutyl-2-azabicyclo[3,2,0]hept-6-en-3-one;
1,4-dibutyl-2-azabicyclo[3,2,0]hept-6-en-3-one;
1,4,6-triethyl-2-azabicyclo[3,2,0]hept-6-en-3-one;
1,4-diethyl-6-methyl-2-azabicyclo[3,2,0]hept-6-en-3-one;
1,4-dimethyl-6-ethyl-2-azabicyclo[3,2,0]hept-6-en-3-one;
6-tert-butyl-1,4-dimethyl-2-azabicyclo[3,2,0]hept-6-en-3-one;
1,4-diisopropyl-6-methyl-2-azabicyclo[3,2,0]hept-6-en-3-one;
1,4-diisobutyl-6-propyl-2-azabicyclo[3,2,0]hept-6-en-3-one;
6-sec-butyl-1,4-dimethyl-2-azabicyclo[3,2,0]hept-6-en-3-one; and
1,4,6-triisopropyl-2-azabicyclo[3,2,0]hept-6-en-3-one, respectively.

EXAMPLE 2

1,2,4,6-tetramethyl-2-azabicyclo[3,2,0]hept-6-en-3-one

A 51.5% sodium hydride suspension in mineral oil (1.55 g.; equivalent to 0.033 mole of sodium hydride) was added to a solution of 1,4,6-trimethyl-2-azabicyclo[3,2,0]-hept-6-en-one (5.0 g.; 0.033 mole) in 40 ml. of dimethylformamide. The resulting mixture was stirred and warmed to 50° C. during 30 minutes. After cooling to about 10° C., methyl iodide (4.9 g.; 0.0345 mole) was added. A precipitate formed immediately and the color of the reaction mixture changed from brown to pale yellow. The mixture was then heated with stirring at 50° C. for 30 minutes. After again cooling to about 20° C., 50 ml. of diethyl ether was added and the precipitate was filtered. The filtrate was evaporated, and the residual oil was distilled to give 3.8 g. of a colorless liquid; B.P. 100–110° C. at 11 mm.; $n_D^{20}$ 1.4835. The liquid was redistilled to give 1,2,4,6-tetramethyl-2-azabicyclo[3,2,0]-hept-6-en-3-one; B.P. 110–111° C. at 11 mm.; $n_D^{25}$ 1.4830.

Analysis.—Calcd. for $C_{10}H_{15}NO$: C, 72.69; H, 9.15; N, 8.48. Found: C, 72.47; H, 8.94; N, 8.22.

Following the procedure of Example 2, but substituting for the methyl iodide, isopropyl chloride; propyl iodide; isobutyl bromide; pentyl bromide; hexyl chloride; allyl bromide; 2-methyl-2-butenyl bromide; 4-methyl-2-pententyl chloride; 2-propynyl bromide; 3-pentynyl chloride; cyclopentyl cloride; cyclohexyl bromide; 4-tert-butylcyclohexyl chloride; benzyl bromide; and 1-naphthylmethyl chloride, there are obtained 2-isopropyl-1,4,6-trimethyl-2-azabicyclo[3,2,0]hept-6-en-3-one;

2-propyl-1,4,6-trimethyl-2-azabicyclo[3,2,0]hept-6-en-3-one;
2-isobutyl-1,4,6-trimethyl-2-azabicyclo[3,2,0]hept-6-en-3-one;
2-pentyl-1,4,6-trimethyl-2-azabicyclo[3,2,0]hept-6-en-3-one;
2-hexyl-1,4,6-trimethyl-2-azabicyclo[3,2,0]hept-6-en-3-one;
2-allyl-1,4,6-trimethyl-2-azabicyclo[3,2,0]hept-6-en-3-one;
2-(2-methyl-2-butenyl)-1,4,6-trimethyl-2-azabicyclo-[3,2,0]hept-6-en-3-one;
2-(4-methyl-2-pentenyl)-1,4,6-trimethyl-2-azabicyclo-[3,2,0]hept-6-en-3-one;
2-(2-propynyl)-1,4,6-trimethyl-2-azabicyclo[3,2,0]hept-6-en-3-one;
2-(3-pentynyl)-1,4,6-trimethyl-2-azabicyclo[3,2,0]hept-6-en-3-one;
2-cyclopentyl-1,4,6-trimethyl-2-azabicyclo[3,2,0]hept-6-en-3-one;
2-cyclohexyl-1,4,6-trimethyl-2-azabicyclo[3,2,0]hept-6-en-3-one;
2-(4-tert-butylcyclohexyl)-1,4,6-trimethyl-2-azabicyclo-[3,2,0]hept-6-en-3-one;
2-benzyl-1,4,6-trimethyl-2-azabicyclo[3,2,0]hept-6-en-3-one; and
2-(1-naphthylmethyl)-1,4,6-trimethyl-2-azabicyclo-[3,2,0]hept-6-en-3-one, respectively.

Following the procedure of Example 2, but substituting for the combination of 1,4,6 - trimethyl - 2 - azabicyclo [3,2,0]hept-6-en-3-one and methyl iodide as reactants, 1,4-dimethyl-2-azabicyclo[3,2,0]hept-6-en-3-one plus isopropyl chloride;
1,4-diethyl-2-azabicyclo[3,2,0]hept-6-en-3-one plus ethyl iodide;
1,4-dipropyl-2-azabicyclo[3,2,0]hept-6-en-3-one plus isohexyl bromide;
1,4-diisopropyl-2-azabicyclo[3,2,0]hept-6-en-3-one plus allyl bromide;
1,4-diisobutyl-2-azabicyclo[3,2,0]hept-6-en-3-one plus 5-hexenyl chloride;
1,4-dibutyl-2-azabicyclo[3,2,0]hept-6-en-3-one plus 2-butenyl bromide;
1,4,6-triethyl-2-azabicyclo[3,2,0]hept-6-en-3-one plus 2-propyl chloride;
1,4-diethyl-6-methyl-2-azabicyclo[3,2,0]hept-6-en-3-one plus 5-hexynyl chloride;
1,4-dimethyl-6-ethyl-2-azabicyclo[3,2,0]hept-6-en-3-one plus cyclopentyl chloride;
6-tert-butyl-1,4-dimethyl-2-azabicyclo[3,2,0]hept-6-en-one plus 4-methyl-cyclohexyl bromide;
1,4-diisopropyl-6-methyl-2-azabicyclo[3,2,0]hept-6-en-one plus benzyl chloride;
and 1,4,6-triisopropyl-2-azabicyclo[3,2,0]hept-6-en-3-one plus 2-naphthylmethyl chloride, there are obtained
1,4-dimethyl-2-isopropyl-2-azabicyclo[3,2,0]hept-6-en-3-one;
1,2,4-triethyl-2-azabicyclo[3,2,0]hept-6-en-3-one;
1,4-dipropyl-2-isohexyl-2-azabicyclo[3,2,0]hept-6-en-3-one;
2-allyl-1,4-diisopropyl-2-azabicyclo[3,2,0]hept-6-en-one;
1,4-diisobutyl-2-(5-hexenyl)-2-azabicyclo[3,2,0]hept-6-en-3-one;
2-(2-butenyl)-1,4-dibutyl-2-azabicyclo[3,2,0]hept-6-en-3-one;
2-(2-propynyl)-1,4,6-triethyl-2-azabicyclo[3,2,0]hept-6-en-3-one;
1,4-diethyl-2-(5-hexynyl)-6-methyl-2-azabicyclo[3,2,0]hept-6-en-3-one;
2-cyclopentyl-1,4-dimethyl-6-ethyl-2-azabicyclo[3,2,0]hept-6-en-3-one;
6-tert-butyl-1,4-dimethyl-2-(4-methylcyclohexyl)-2-azabicyclo[3,2,0]hept-6-en-3-one;
2-benzyl-1,4-diisopropyl-6-methyl-2-azabicyclo[3,2,0]hept-6-en-3-one; and
2-(2-naphthylmethyl)-1,4,6-triisopropyl-2-azabicyclo [3,2,0]hept-6-en-3-one, respectively.

EXAMPLE 3

*1,3-dihydro-1,3,5,7-tetramethyl-2H-azepin-2-one*

A 51.5% sodium hydride suspension in mineral oil (9.0 g.; equivalent to 0.19 mole of sodium hydride) was added to a solution of 1,3-dihydro-3,5,7-trimethyl-2H-azepin-2-one (29.0 g.; 0.19 mole) in 150 ml. of dimethylformamide. The mixture was stirred at 50° C. for 1 hour. After cooling, methyl iodide (42.6 g.; 0.30 mole) was added in two portions. After stirring for 1 hour, 250 ml. of diethyl ether was added and the resulting slurry was filtered. The oil remaining after evaporation of the solvent in the filtrate was distilled to yield 29.45 g. of a colorless liquid; B.P. 115–120° C. at 11 mm. Redistillation gave 1,3 - dihydro-1,3,5,7-tetramethyl-2H-azepin-2-one; B.P. 121.5° C. at 13 mm.; $n_D^{24}$ 1.5198.

*Analysis.*—Calcd. for $C_{10}H_{15}NO$: C, 72.69; H, 9.15; N, 8.48. Found: C, 72.32; H, 9.26; N, 8.59.

Following the procedure of Example 3, but substituting for the methyl iodide, isopropyl chloride; propyl iodide; isobutyl bromide; pentyl bromide; hexyl chloride; allyl bromide; 2-methyl-2-butenyl bromide; 4-methyl-2-pentenyl chloride; 2-propynyl bromide; 3-pentynyl chloride; cyclopentyl chloride; cyclohexyl bromide; 4-tert-butylcyclohexyl chloride; benzyl bromide; and 1-naphthylmethyl chloride, there are obtained 1,3-dihydro-1-isopropyl-3,5,7-trimethyl-2H-azepin-2-one;
1,3-dihydro-1-propyl-3,5,7-trimethyl-2H-azepin-2-one;
1,3-dihydro-1-isobutyl-3,5,7-trimethyl-2H-azepin-2-one;
1,3-dihydro-1-pentyl-3,5,7-trimethyl-2H-azepin-2-one;
1,3-dihydro-1-hexyl-3,5,7-trimethyl-2H-azepin-2-one;
1,3-dihydro-1-allyl-3,5,7-trimethyl-2H-azepin-2-one;
1,3-dihydro-1-(2-methyl-2-butenyl)-3,5,7-trimethyl-2H-azepin-2-one;
1,3-dihydro-1-(4-methyl-2-pentenyl)-3,5,7-trimethyl-2H-azepin-2-one;
1,3-dihydro-1-(2-propynyl)-3,5,7-trimethyl-2H-azepin-2-one;
1,3-dihydro-1-(3-pentynyl)-3,5,7-trimethyl-2H-azepin-2-one;
1,3-dihydro-1-cyclopentyl-3,5,7-trimethyl-2H-azepin-2-one;
1,3-dihydro-1-cyclohexyl-3,5,7-trimethyl-2H-azepin-2-one;
1,3-dihydro-1(4-tert-butylcyclohexyl)-3,5,7-trimethyl-2H-azepin-2-one;
1,3-dihydro-1-benzyl-3,5,7-trimethyl-2H-azepin-2-one; and
1,3-dihydro-1-(1-naphthylmethyl)-3,5,7-trimethyl-2H-azepin-2-one, respectively.

Following the procedure of Example 3, but substituting for the combination of 1,3-dihydro-3,5,7-trimethyl-2H-azepin-2-one and methyl iodide as reactants, 1,3-dihydro-3,7-dimethyl-2H-azepin-2-one plus isopropyl chloride;
1,3-dihydro-3,7-dimethyl-2H-azepin-2-one plus cyclopentyl chloride;
1,3-dihydro-3,7-diethyl-2H-azepin-2-one plus benzyl bromide;
1,3-dihydro-3,7-diethyl-2H-azepin-2-one plus allyl bromide;
1,3-dihydro-3,7-dipropyl-2H-azepin-2-one plus propyl iodide;
1,3-dihydro-3,7-diisopropyl-2H-azepin-2-one plus 4-tert-butylcyclohexyl chloride;
1,3-dihydro-3,7-diisobutyl-2H-azepin-2-one plus propyl bromide;
1,3-dihydro-3,7-dibutyl-2H-azepin-2-one plus pentyl bromide;
1,3-dihydro-3,5,7-triethyl-2H-azepin-2-one plus 2-propynyl bromide;
1,3-dihydro-3,7-diethyl-5-methyl-2H-azepin-2-one plus benzyl bromide;

1,3-dihydro-3,7-dimethyl-5-ethyl-2H-azepin-2-one plus hexyl chloride;
1,3-dihydro-5-tert-butyl-3,7-dimethyl-2H-azepin-2-one plus 1-naphthylmethyl chloride;
1,3-dihydro-3,7-diisopropyl-5-methyl-2H-azepin-2-one plus allyl bromide;
1,3-dihydro-3,7-diisobutyl-5-propyl-2H-azepin-2-one plus propyl iodide;
1,3-dihydro-5-sec-butyl-3,7-dimethyl-2H-azepin-2-one plus 2-propynyl bromide; and
1,3-dihydro-3,5,7-triisopropyl-2H-azepin-2-one plus isopropyl chloride, there are obtained
1,3-dihydro-3,7-dimethyl-1-isopropyl-2H-azepin-2-one;
1,3-dihydro-1-cyclopentyl-3,7-dimethyl-2H-azepin-2-one;
1,3-dihydro-1-benzyl-3,7-diethyl-2H-azepin-2-one;
1,3-dihydro-1-allyl-3,7-diethyl-2H-azepin-2one;
1,3-dihydro-1,3,7-tripropyl-2H-azepin-2-one;
1,3-dihydro-1-(4-tert-butylcyclohexyl)-3,7-diisopropyl-2H-azepin-2-one;
1,3-dihydro-3,7-diisobutyl-1-propyl-2H-azepin-2-one;
1,3-dihydro-3,7-dibutyl-1-pentyl-2H-azepin-2-one;
1,3-dihydro-1-(2-propynyl)-3,5,7-triethyl-2H-azepin-2-one;
1,3-dihydro-1-benzyl-3,7-diethyl-5-methyl-2H-azepin-2-one;
1,3-dihydro-3,7-dimethyl-5-ethyl-1-hexyl-2H-azepin-2-one;
1,3-dihydro-5-tert-butyl-3,7-dimethyl-1-(1-naphthylmethyl)-2H-azepin-2-one;
1,3-dihydro-1-allyl-3,7-diisopropyl-5-methyl-2H-azepin-2-one;
1,3-dihydro-3,7-diisobutyl-1,5-dipropyl-2H-azepin-2-one;
1,3-dihydro-5-sec-butyl-3,7-dimethyl-1-(2-propynyl)-2H-azepin-2-one; and
1,3-dihydro-1,3,5,7-tetraisopropyl-2H-azepin - 2 - one, respectively.

EXAMPLE 4

*1,2,4,6-tetramethyl-2-azabicyclo[3,2,0]hept-6-en-3-one*

Following the procedure of Example 1, Part B, 1,3-dihydro-1,3,5,7-tetramethyl-2H-azepin-2-one was exposed to ultraviolet radiation to give 1,2,4,6-tetramethyl-2-azabicyclo[3,2,0]hept-6-en-3-one.

Following the procedure of Example 4, but substituting for the
1,3-dihydro-1,3,5,7-tetramethyl-2H-azepin-2-one,
1,3-dihydro-1-isopropyl-3,5,7-trimethyl-2H-azepin-2-one;
1,3-dihydro-1-pentyl-3,5,7-trimethyl-2H-azepin-2-one;
1,3-dihydro-1-allyl-3,5,7-trimethyl-2H-azepin-2-one;
1,3-dihydro-1-cyclopentyl-3,5,7-trimethyl-2H-azepin-2-one;
1,3-dihydro-1-benzyl-3,7-diethyl-2H-azepin-2-one;
1,3-dihydro-1,3,7-tripropyl-2H-azepin-2-one; and
1,3-dihydro-1-cyclohexyl-3,7-dimethyl-5-ethyl-2H-azepin-2-one, there are obtained
2-isopropyl-1,4,6-trimethyl-2-azabicyclo[3,2,0]hept-6-en-3-one;
2-pentyl-1,4,6-trimethyl-2-azabicyclo[3,2,0]hept-6-en-3-one;
2-allyl-1,4,6-trimethyl-2-azabicyclo[3,2,0]hept-6-en-3-one;
2-cyclopentyl-1,4,6-trimethyl-2-azabicyclo[3,2,0]hept-6-en-3-one;
2-benzyl-1,4-diethyl-2-azabicyclo[3,2,0]hept-6-en-3-one;
1,2,4-tripropyl-2-azabicyclo[3,2,0]hept-6-en-3-one; and
2-cyclohexyl-1,4-dimethyl-6-ethyl-2-azabicyclo[3,2,0]hept-6-en-3-one, respectively.

EXAMPLE 5

*1,4,6-trimethyl-2-azabicyclo[3,2,0]heptan-3-one*

A mixture of 1,4,6-trimethyl-2-azabicyclo[3,2,0]hept-6-en-3-one (9.2 g.; 0.061 mole), 100 ml. of ethanol, and 200 mg. of palladium catalyst (10% palladium on charcoal) was shaken with hydrogen at atmospheric pressure and at about 25° C. for 120 minutes. Absorption of hydrogen was about 96% of the theoretical (0.061 mole). The mixture was filtered and the solvent was removed by distillation at reduced pressure. The crystalline residue was slurried at 0° to 5° C. with about 10 ml. of hexane and filtered. The filtrate was cooled and filtered to give 7.7 g. of greyish-white blades; M.P. 94.5–96° C. Two recrystallizations from hexane gave 1,4,6-trimethyl-2-azabicyclo[3,2,0]heptan-3-one; M.P. 97.5–98.0° C.

*Analysis.*—Calcd. for $C_9H_{15}NO$: C, 70.55; H, 9.87; N, 9.14. Found: C, 70.78; H, 9.93; N, 9.33.

Following the procedure of Example 5, but substituting for the 1,4,6-trimethyl-2-azabicyclo[3,2,0]hept-6-en-3-one,
1,4-dimethyl-2-azabicyclo[3,2,0]hept-6-en-3-one;
1,4-diethyl-2-azabicyclo[3,2,0]hept-6-en-3-one;
1,4-diisobutyl-2-azabicyclo[3,2,0]hept-6-en-3-one;
1,4,6-triethyl-2-azabicyclo[3,2,0]hept-6-en-3-one;
1,4-dimethyl-6-ethyl-2-azabicyclo[3,2,0]hept-6-en-3-one;
1,4-diisopropoyl-2-azabicyclo[3,2,0]hept-6-en-3-one;
and 6-sec-butyl-1,4-dimethyl-2-azabicyclo[3,2,0]hept-6-en-3-one, there are obtained
1,4-dimethyl-2-azabicyclo[3,2,0]heptan-3-one;
1,4-diethyl-2-azabicyclo[3,2,0]heptan-3-one;
1,4-diisobutyl-2-azabicyclo[3,2,0]heptan-3-one;
1,4,6-triethyl-2-azabicyclo[3,2,0]heptan-3-one;
1,4-dimethyl-6-ethyl-2-azabicyclo[3,2,0]heptan-3-one;
1,4-diisopropyl-2-azabicyclo[3,2,0]heptan-3-one; and
6-sec-butyl-1,4-dimethyl-2-azabicyclo[3,2,0]heptan-3-one, respectively.

EXAMPLE 6

*1,2,4,6-tetramethyl-2-azabicyclo[3,2,0]heptan-3-one*

A mixture of 1,2,4,6-tetramethyl-2-azabicyclo[3,2,0]-hept-6-en-3-one (7.0 g.; 0.042 mole), 100 ml. of absolute ethanol, and 200 mg. of palladium catalyst (10% palladium on charcoal) was shaken with hydrogen at atmospheric pressure and at about 25° C. for 120 minutes. Absorption of hydrogen ceased after 0.042 mole had been consumed. The mixture was filtered and the solvent was removed by distillation at reduced pressure. Benzene (50 ml.) was then added to the residue and the resulting solution was again evaporated to remove remaining traces of ethanol. The residue, 1,2,4,6-tetramethyl-2-azabicyclo-[3,2,0]heptan-3-one, was purified by distillation at reduced pressure.

Following the procedure of Example 6, but substituting for the 1,2,4,6-tetramethyl-2-azabicyclo[3,2,0]hept-6-en-3-one,
2-pentyl-1,4,6-trimethyl-2-azabicyclo[3,2,0]hept-6-en-3-one;
2-allyl-1,4,6-trimethyl-2-azabicyclo[3,2,0]hept-6-en-3-one;
1,2,4-triethyl-2-azabicyclo[3,2,0]hept-6-en-3-one;
2-(2-butenyl)-1,4-dibutyl-2-azabicyclo[3,2,0]hept-6-en-3-one;
2-cyclopentyl-1,4-dimethyl-6-ethyl-2-azabicyclo-[3,2,0]hept-6-en-3-one; and
2-(2-propynyl)-1,4,6-thiethyl-2-azabicyclo[3,2,0]hept-6-en-3-one, there are obtained
2-pentyl-1,4,6-trimethyl-2-azabicyclo[3,2,0]heptan-3-one;
2-propyl-1,4,6-trimethyl-2-azabicyclo[3,2,0]heptan-3-one;
1,2,4-triethyl-2-azabicyclo[3,2,0]heptan-3-one;
1,2,4-tributyl-2-azabicyclo[3,2,0]heptan-3-one;
2-cyclopentyl-1,4-dimethyl-6-ethyl-2-azabicyclo-[3,2,0]heptan-3-one; and
2-propyl-1,4,6-triethyl-2-azabicyclo[3,2,0]heptan-3-one, respectively.

In those of the above instances involving the presence of an alkenyl or alkynyl moiety in the reactant, enough hydrogen is used to saturate not only the 6,7-double bond but also the carbon-carbon double or triple bond in the alkenyl or alkynyl moiety.

EXAMPLE 7

*1,2,4,6-tetramethyl-2-azabicyclo[3,2,0]heptan-3-one*

Following the procedure of Example 2, 1,4,6-trimethyl-2-azabicyclo[3,2,0]heptan-3-one was reacted first with sodium hydride and then with methyl iodide to obtain 1,2,4,6-tetramethyl-2-azabicyclo[3,2,0]heptan-3-one.

Following the procedure of Example 7, but substituting for the methyl iodide, isopropyl chloride; allyl bromide; 2-propynyl chloride; cyclohexyl bromide; and benzyl bromide, there are obtained 2-isopropyl-1,4,6-trimethyl-2-azabicyclo[3,2,0]heptan-3-one;

2-allyl-1,4,6-trimethyl-2-azabicyclo[3,2,0]heptan-3-one;

2-(2-propynyl)-1,4,6-trimethyl-2-azabicyclo[3,2,0]-heptan-3-one;

2-cyclohexyl-1,4,6-trimethyl-2-azabicyclo[3,2,0]heptan-3-one; and 2-benzyl-1,4,6-trimethyl-2-azabicyclo[3,2,0]heptan-3-one, respectively.

Following the procedure of Example 7, but substituting for the combination of 1,4,6-trimethyl-2-azabicyclo[3,2,0]heptan-3-one and methyl iodide as reactants, 1,4-dipropyl-2-azabicyclo[3,2,0]heptan-3-one plus isohexyl bromide; 1,4-dibutyl-2-azabicyclo[3,2,0]heptan-3-one plus 2-butenyl bromide; 1,4-diethyl-6-methyl-2-azabicyclo[3,2,0]heptan-3-one plus 5-hexynyl chloride; 1,4-dimethyl-6-ethyl-2-azabicyclo[3,2,0]heptan-3-one plus cyclopentyl chloride; and 1,4,6-triisopropyl-2-azabicyclo[3,2,0]heptan-3-one plus 2-naphthylmethyl chloride, there are obtained 1,4-dipropyl-2-isohexyl-2-azabicyclo[3,2,0]heptan-3-one;

2-(2-butenyl)-1,4-dibutyl-2-azabicyclo[3,2,0]heptan-3-one;

1,4-diethyl-2-(5-hexynyl)-6-methyl-2-azabicyclo[3,2,0]heptan-3-one;

2-cyclopentyl-1,4-dimethyl-6-ethyl-2-azabicyclo[3,2,0]heptan-3-one; and 2-(2-naphthylmethyl)-1,4,6-triisopropyl-2-azabicyclo[3,2,0]heptan-3-one, respectively.

I claim:

1. A compound of the formula:

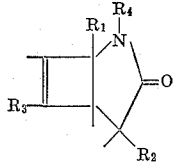

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, and wherein $R_4$ is selected from the group consisting of hydrogen, alkyl of 1 to 6 carbon atoms, inclusive, alkenyl of 3 to 6 carbon atoms, inclusive, alkynyl of 3 to 6 carbon atoms, inclusive, cycloalkyl of 5 to 10 carbon atoms, inclusive, and aralkyl of 7 to 11 carbon atoms, inclusive.

2. 1,4,6-trimethyl-2-azabicyclo[3,2,0]hept-6-en-3-one.

3. 1,2,4,6 - tetramethyl - 2 - azabicyclo[3,2,0]hept - 6-en-3-one.

4. A process for producing a 2-azabicyclo[3,2,0]hept-6-en-3-one of the formula:

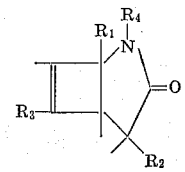

wherein $R_1$ and $R_2$ are alkyl of 1 to 4 carbon atoms, inclusive, wherein $R_3$ is selected from the group consisting of hydrogen and alkyl of 1 to 4 carbon atoms, inclusive, and wherein $R_4$ is selected from the group consisting of hydrogen, alkyl of 1 to 6 carbon atoms, inclusive, alkenyl of 3 to 6 carbon atoms, inclusive, alkynyl of 3 to 6 carbon atoms, inclusive, cycloalkyl of 5 to 10 carbon atoms, inclusive, and aralkyl of 7 to 11 carbon atoms, inclusive, which comprises exposing a compound of the formula:

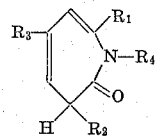

wherein $R_1$, $R_2$, $R_3$, and $R_4$ are as given above, to ultraviolet radiation, to form said 2-azabicyclo[3,2,0]hept-6-en-3-one.

5. The process of claim 4 wherein the wave length of said ultraviolet radiation includes the range 240 to 260 millimicrons.

6. The process of claim 4 wherein $R_4$ is hydrogen.

7. The process of claim 6 wherein the wave length of said ultraviolet radiation includes the range 240 to 260 millimicrons.

No references cited.

ALEX MAZEL, *Primary Examiner.*

JOSE TOVAR, *Assistant Examiner.*